UNITED STATES PATENT OFFICE.

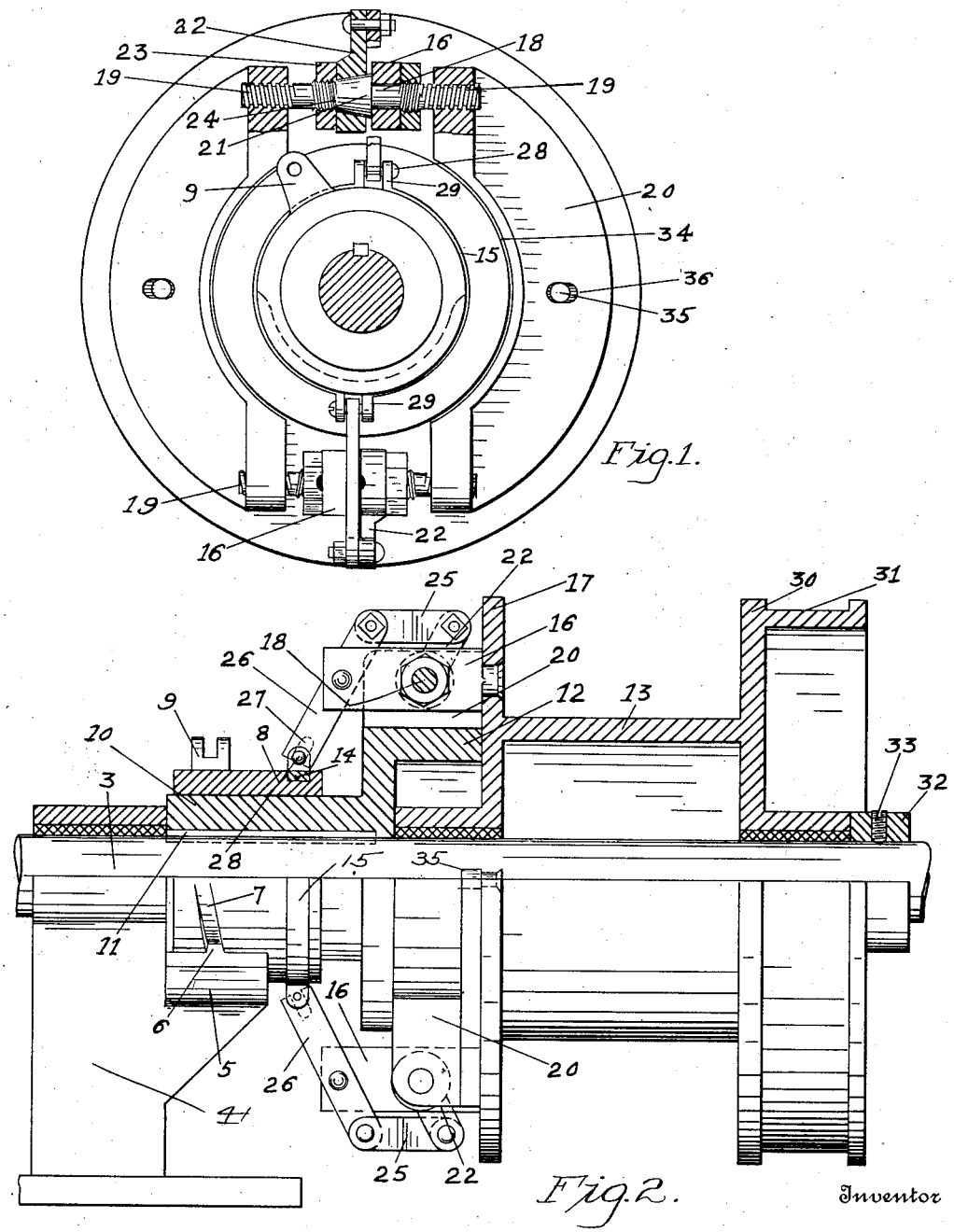

ADOLPH FRED WALTHER, OF OAKLAND, CALIFORNIA.

CLUTCH.

1,038,033.   Specification of Letters Patent.   Patented Sept. 10, 1912.

Application filed December 4, 1911. Serial No. 663,890.

*To all whom it may concern:*

Be it known that I, ADOLPH FRED WALTHER, a citizen of the United States, residing at Oakland, in the county of Alameda and State of California, have invented certain new and useful Improvements in Clutches, of which the following is a specification.

This invention relates to clutches and has for its object the construction of a clutch which may be quickly and efficiently thrown to an operative position.

Another object of this invention is the production of a clutch which is simple in construction, efficient in operation, and consists of comparatively small number of parts.

With these and other objects in view the invention consists in general of certain novel constructions, combinations and arrangements of parts as will be hereinafter fully described, illustrated in the accompanying drawings, and specifically claimed.

In the accompanying drawings like characters of reference indicate like parts in the several views, and: Figure 1 is an end elevation of the clutch. Fig. 2 is a side elevation thereof partly in section.

In the accompanying drawings 3 designates the shaft which is supported by means of a journal 4. This journal 4 carries upon one side thereof a ring supporting pocket 5. A beveled rib 6 is carried by the inner face of the pocket 5 and this rib 6 is adapted to fit in a worm groove 7 formed in the shifting ring 8. An ear 9 is carried by the shifting ring 8 and to this ear is adapted to be attached an operating link, not shown, for rotating the ring 8 upon the hub 10. The hub 10 is keyed to the shaft 3 by means of a key 11 and this hub is adapted to normally rotate with said shaft 3. The hub 10 is provided with an expanded cylindrical portion 12, the edge of which is adapted to engage one face of the hoisting drum 13. A cylindrical groove 14 is formed upon the ring 8 and within this cylindrical groove 14 fits a split ring 15.

Lugs 16 are fixedly secured to the flange 17 of the hoisting drum 13 and upon these flanges 6 are journaled shafts 18. The ends of the shaft 18 are threaded in opposite directions as at 19 so that when the shafts 18 are rotated the clutch segments 20 will be drawn together thereby causing the clutch segments to firmly grip the cylindrical portions 12. An enlarged conical portion is carried centrally of the shafts 18 upon which is mounted the arm 22. This arm 22 is held firmly in place by means of a binding nut 23 which is mounted upon the threads 24. The arms 22 carry links 25 which links in turn carry at their outer ends inwardly extending link sections 26. These link sections 26 are bifurcated at their free ends as at 27, which bifurcated ends are carried by the split rings 15 at their joint connections 29.

The hoisting drum 13 is provided with a flared flange 30 having a channel 31 formed upon its outer edge. A collar 32 is carried by the shaft 3 and is held in engagement therewith by means of a screw 33 for holding the winding drum 13 against longitudinal movement on the shaft 3.

When it is desired to throw the clutch the ring 8 is rotated thereby causing the ring to slide upon the hub 10. Owing to the fact that the rib 6 will travel in the groove 7 as the ring 8 is rotated and since the groove 7 is a worm groove it will be obvious that as the ring 8 is rotated the same will slide upon the hub 10 pushing the inwardly extending ends of the link sections 26 inwardly, drawing the links 25 outwardly, and swinging the upper end of the arm 22 outwardly. By this motion the shaft 18 will be so rotated as to draw the sections 20 thereby causing the gripping faces 34 thereof to firmly grip the cylindrical portion 12. The winding drum 13 will then be rotated with the shaft 3 and since the split ring 15 is loosely mounted within the slot 14 it will be obvious that the clutch mechanism may be freely rotated independently of the ring 8. The sections 20 are held upon the winding drum 13 by means of pins 35 which work in transversely extending slots 36 formed in the sections 20.

If the inner faces 34 of the clutch members 20 should become worn the nut 23 may be unthreaded from the threads 24 of the shaft 18 and by rotating the shaft the clutch members may be drawn slightly together. When the clutch members 20 are drawn to the desired position the nut 23 may be again threaded upon the threads 24 of the shaft 18 thereby firmly clamping the shaft 18 in engagement with the operating arm 22.

From the foregoing description it will be obvious that a very efficient clutch mechanism has been produced whereby the same may be easily and quickly adjusted to accommodate the wear which would likely occur upon a clutch of the kind described.

Having thus described the invention, what is claimed is:

1. A clutch of the class described comprising a support, a shaft, a pocket carried by said support, and being provided with an angularly extending lip upon the inner face thereof, a collar carried by said shaft, a ring carried by said collar, said ring being provided with a worm groove upon its outer face and being adapted to engage said rib of said support whereby said ring will be moved inwardly as said ring is rotated in one direction and moved outwardly when said ring is rotated in the opposite direction, a rotating drum, clutch members carried by said drum, and means carried by said drum and coöperating with said ring and clutch members for causing said clutch members to engage said collar when said ring is moved inwardly.

2. A clutch of the class described comprising a shaft, a support therefor, a collar keyed to said shaft, a flared clutch engaging portion carried by said collar, a rotating drum loosely mounted upon said shaft, ears carried by said drum and extending laterally thereof, clutch members carried by said rotating drum and partially encircling said flared portion of said collar, rotating shafts carried by said ears having oppositely threaded ends engaging said clutch members for drawing said clutch members together when said shafts are rotated and causing said clutch members to engage said flared portion of said collar, and means coöperating with said shafts for rotating the same.

3. A clutch of the class described comprising a shaft, a support therefor, a drum loosely mounted upon said shaft, a collar keyed to said shaft, ears carried by said drum, a ring carried by said collar and slidably mounted thereon, said collar being provided with a cylindrical groove, a split ring carried within said groove and loosely mounted therein, rotating shafts carried by said ears, clutch members carried by said drums and coöperating with said shaft whereby said clutch members will be drawn together when said shaft is rotated, an operating arm carried by said shaft, a conical portion formed upon said shaft and engaging said arm, a nut threaded upon said shaft and engaging said arm for holding the same in engagement with said conical portion, link members engaging the upper end of said arm, pins carried by said split ring, some of said links engaging said pins whereby said links will be swung when said first mentioned ring is slit upon said collar and said last mentioned shaft will be rotated for drawing said clutch members to an operative position.

In testimony whereof I affix my signature in presence of two witnesses.

ADOLPH FRED WALTHER.

Witnesses:
F. P. SCHROEDER,
W. A. STOCK.

---

Copies of this patent may be obtained for five cents each, by addressing the "Commissioner of Patents, Washington, D. C."